United States Patent
Nagai et al.

(10) Patent No.: US 11,216,243 B2
(45) Date of Patent: Jan. 4, 2022

(54) AUDIO VISUAL DEVICE, PLAYBACK METHOD, AND PLAYBACK SYSTEM

(71) Applicant: YAMAHA CORPORATION, Hamamatsu (JP)

(72) Inventors: Hisashi Nagai, Hamamatsu (JP); Naoaki Kurita, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/889,934

(22) Filed: Jun. 2, 2020

(65) Prior Publication Data
US 2020/0387345 A1    Dec. 10, 2020

(30) Foreign Application Priority Data
Jun. 7, 2019    (JP) .............................. JP2019-107197

(51) Int. Cl.
   *G06F 3/16*    (2006.01)
   *G06F 3/0362*    (2013.01)

(52) U.S. Cl.
   CPC ............ *G06F 3/165* (2013.01); *G06F 3/0362* (2013.01)

(58) Field of Classification Search
   CPC .... G11B 3/00; G11B 3/06; G11B 3/08; G11B 3/60; G11B 3/68; G10H 2220/005
   See application file for complete search history.

(56) References Cited

U.S. PATENT DOCUMENTS

| | | | | |
|---|---|---|---|---|
| 3,584,883 A * | 6/1971 | Horstmann | ............... | G11B 3/08 369/244.1 |
| 3,672,687 A * | 6/1972 | Ben Daniel | ............ | G11B 3/095 369/33.01 |
| 4,147,365 A * | 4/1979 | Kurata | ................. | G11B 33/022 369/249.1 |
| 5,155,605 A * | 10/1992 | Wreede | ..................... | G03H 1/26 359/22 |
| 2004/0057344 A1* | 3/2004 | Baumann | ............... | G11B 19/00 369/18 |
| 2006/0093777 A1* | 5/2006 | Handy | ..................... | B32B 7/02 428/64.1 |
| 2008/0037082 A1* | 2/2008 | Ogasawara | ........ | G11B 7/24044 359/3 |

(Continued)

FOREIGN PATENT DOCUMENTS

GB    2486816 A    *   6/2012   .......... G11B 27/005
WO    2008120397 A1       10/2008

OTHER PUBLICATIONS

Erika Records, "Glow in the Dark Vinyl Records", (Sep. 5, 2010), <URL: http://www.erikarecords.com/glowinthedark.html/>, p. 1 (Year: 2010).*

(Continued)

*Primary Examiner* — Mong-Shune Chung
(74) *Attorney, Agent, or Firm* — Rossi, Kimms & McDowell LLP

(57) ABSTRACT

An audio visual device includes a drive circuit and a rotatable body configured to be driven by the drive circuit and configured to change a playback point of a sound signal representative of a series of sounds in accordance with a rotation of the rotatable body. The rotatable body configured to change the playback point of the sound signal is further configured to display an image.

10 Claims, 6 Drawing Sheets

(56) References Cited

U.S. PATENT DOCUMENTS

| | | | | |
|---|---|---|---|---|
| 2012/0230175 A1* | 9/2012 | Ward | ............... | G11B 23/44 |
| | | | | 369/271.1 |
| 2012/0243711 A1* | 9/2012 | Fujita | ............... | H04H 60/04 |
| | | | | 381/119 |
| 2013/0162649 A1* | 6/2013 | Oshima | ............ | G10H 1/361 |
| | | | | 345/440 |

OTHER PUBLICATIONS

Ebay, "Turntable Record Player LED Lamp Light HiFI+ fits Michell Pro-Ject Rega Technics", (Jul. 15, 2017), <URL: https://www.ebay.co.uk/itm/182665049936/>, p. 1-12 (Year: 2017).*

DJ 10 Speed, "MOD: Jesse Dean Designs JDDPTA-PCB Tone Arm Kit", (Feb. 17, 2019), <URL: https://www.og10speed.com/thedojo/2019/1/27/mod-jddpta-pcb-tone-arm-kit/>, p. 1-6 (Year: 2019).*

* cited by examiner

ABSTRACT

AUDIO VISUAL DEVICE, PLAYBACK METHOD, AND PLAYBACK SYSTEM

CROSS REFERENCE TO RELATED APPLICATION

This Application is based on and claims priority from Japanese Patent Application No. JP 2019-107197, filed Jun. 7, 2019, the entire contents of which are incorporated herein by reference.

BACKGROUND OF THE INVENTION

Field of the Invention

The present invention relates to audio visual (AV) devices, a playback method, and playback systems.

Description of Related Art

An AV device has been proposed by which a user manipulates a disc-shaped operator (turntable) to rotate in a desired direction at a desired speed to control a playback direction (forward direction or backward direction) of music and a playback speed of the music (e.g., WO 2008/120397).

In sound playback by an AV device, of importance is not only an auditory rendering effect but also a visual rendering effect. Improvement in a visual rendering effect of conventional AV devices is desirable.

SUMMARY

An object of the present disclosure is to enhance a visual rendering effect of an AV device.

In order to solve the above-described problem, an AV device according to one aspect of the disclosure includes: a drive circuit; and a rotatable body configured to be driven by the drive circuit and configured to change a playback point of a sound signal representative of a series of sounds in accordance with a rotation of the rotatable body, in which the rotatable body configured to change the playback point of the sound signal is further configured to display an image.

A Playback method according to one aspect of the disclosure includes: changing a playback point of a sound signal representative of a series of sounds in accordance with a rotation of a rotatable body; and displaying an image on the rotatable body that is rotatable to change the playback point of the sound signal.

A Playback system according to one aspect of the disclosure includes: a playback device configured to play back a sound signal representative of a series of sounds; and an audio visual (AV) device configured to be connected to the playback device, in which the AV device includes a rotatable body configured to change a playback point of the sound signal in accordance with a rotation of the rotatable body, and in which the rotatable body configured to change the playback point of the sound signal is further configured to display an image.

DESCRIPTION OF THE EMBODIMENTS

First Embodiment

Figure 1:
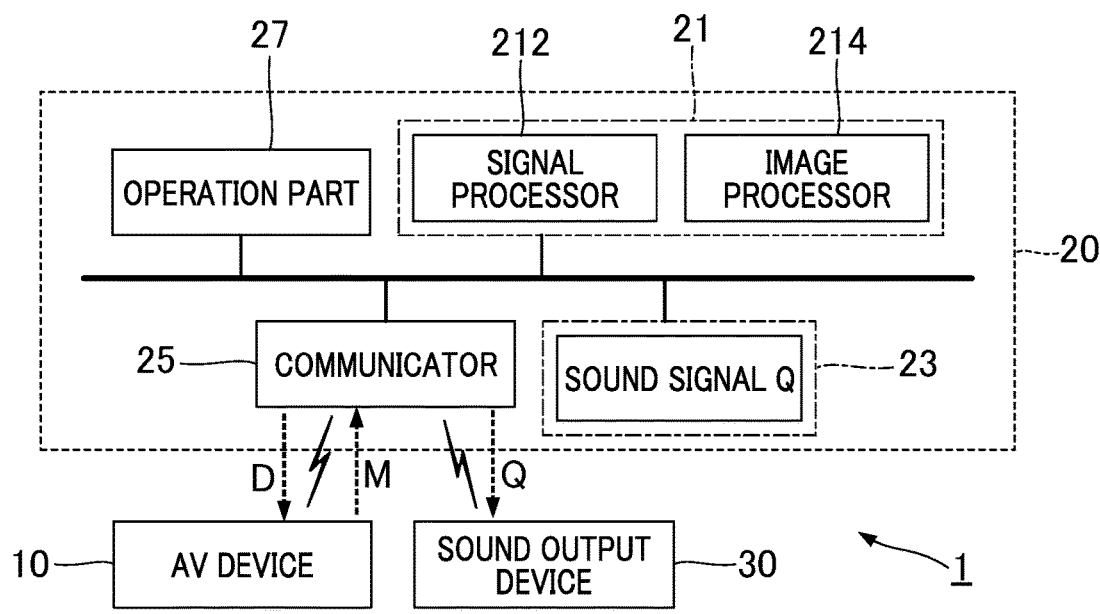
FIG. 1 is a block diagram illustrating a configuration of a playback system according to a first embodiment of the present disclosure.

FIG. 1 is a block diagram illustrating a configuration of a playback system 1 according to a first embodiment of the present disclosure. The playback system 1 is constituted of a computer system for play-back of music, and is used at a variety of event sites, such as a clubs live houses, and other similar facilities. The playback system 1 according to the first embodiment includes an AV device 10, a terminal device 20, and a sound output device 30. The AV device 10 is, for example, a DJ controller for manipulation by a user (e.g., a disc jockey). The terminal device 20 is a playback device that plays back a sound signal representative of a series of sounds, and is connected to the AV device 10 for communication either by wire or wirelessly. The expression "series of sounds" includes a whole piece of music, a part of a piece of music, and sound effects. In the following, an example will be described in which the series of sounds constitutes a whole piece of music. The terminal device 20 controls playback of the content of the piece of music responsive to manipulation of the AV device 10 by the user. The terminal device 20 is, for example, a smartphone. Alternatively, the terminal device 20 may be an information terminal, such as a tablet, a personal computer, or similar device. The sound output device 30 is, for example, a speaker or headphones. The sound output device 30 outputs sound representative of the music under control of the terminal device 20. The sound output device 30 constitutes a part of the playback device. The AV device 10 according to the first embodiment displays an image related to the music (hereafter, referred to as a "music image") under control of the terminal device 20.

The terminal device 20 includes a controller 21, a storage device 23, a communicator 25, and an operation part 27. The controller 21 includes one or more of processing circuits such as a central processing unit (CPU). The controller 21 controls components of the terminal device 20. Stored on the storage device 23 are programs to be executed by the controller 21, along with a variety of data to be used by the controller 21. Any well-known recording medium such as a magnetic recording medium and a semiconductor recording medium is used as the storage device 23. Specifically, on the storage device 23 there is stored a sound signal Q. The sound signal Q is representative of music. The sound signal Q consists of a series of samples, and represents temporal changes in an acoustic waveform produced by, for example, a singing voice or an instrumental or other sound. When the sound output device 30 receives the sound signal Q from the terminal device 20, the music (i.e., the sound signal Q) is played back.

The controller 21 includes a signal processor 212 and an image processor 214. The controller 21 enables the music to be played back (i.e., the sound signal Q), and the music image to be displayed by executing a program stored in the storage device 23. The signal processor 212 controls a point played back (hereinafter, "playback point") on a time axis, of the music played back by the controller 21. Specifically, the signal processor 212 supplies a portion that corresponds to the playback point of the sound signal Q (i.e., a sample that corresponds to a playback point) to the sound output device 30. The image processor 214 generates, based on the sound signal Q, data for display of a music image G (hereafter, "image data D"), and supplies the generated image data D to the AV device 10. The AV device 10 displays the music image G in correspondence with the image data D. Details of the image data D will now be described.

The communicator 25 communicates with the AV device 10 and the sound output device 30. The communicator 25 is connected to the AV device 10 and the sound output device 30 for communication either by wire or wirelessly. Specifically, the communicator 25 transmits the sound signal Q to the sound output device 30 and transmits the image data D to the AV device 10 under control of the controller 21. The operation part 27 is, for example, a touch panel. The operation part 27 is operated by the user to provide various kinds of instructions to the terminal device 20. The operation part 27 may include some different kinds of operators (e.g., buttons). Specifically, the operation part 27 receives from the user an instruction to start playback of the music and an instruction to stop playback of the music.

Upon receipt by the operation part 27 of the instruction to start playback of the music, supply of the sound signal Q to the sound output device 30 is started, along with supply of the image data D to the AV device 10. When the operation part 27 receives the instruction to stop playback of the music, the supply of the sound signal Q to the sound output device 30 is stopped and the supply of the image data D to the AV device 10 is stopped.

Figure 2:
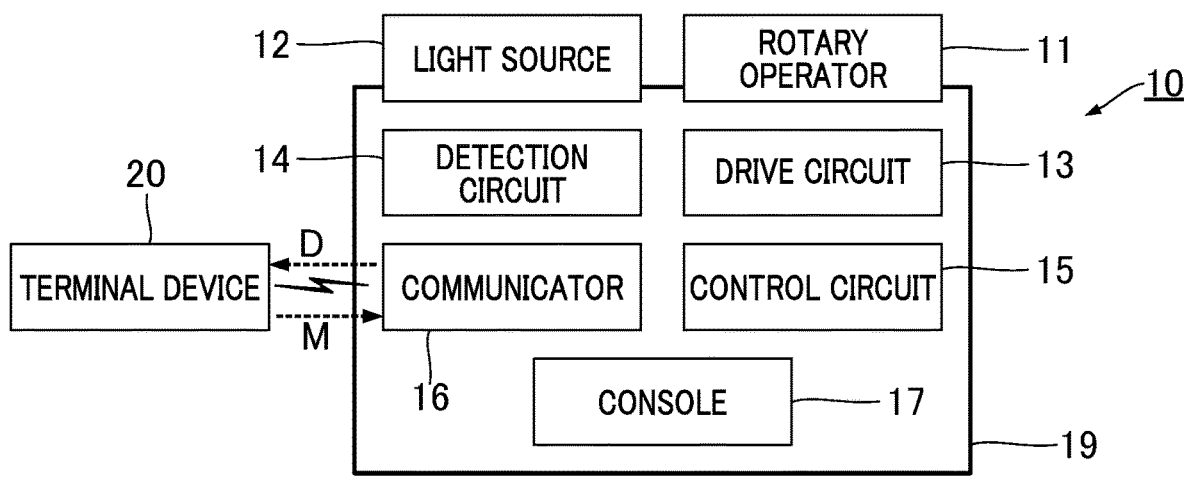
FIG. 2 is a block diagram illustrating a configuration of an AV device.
Figure 3:
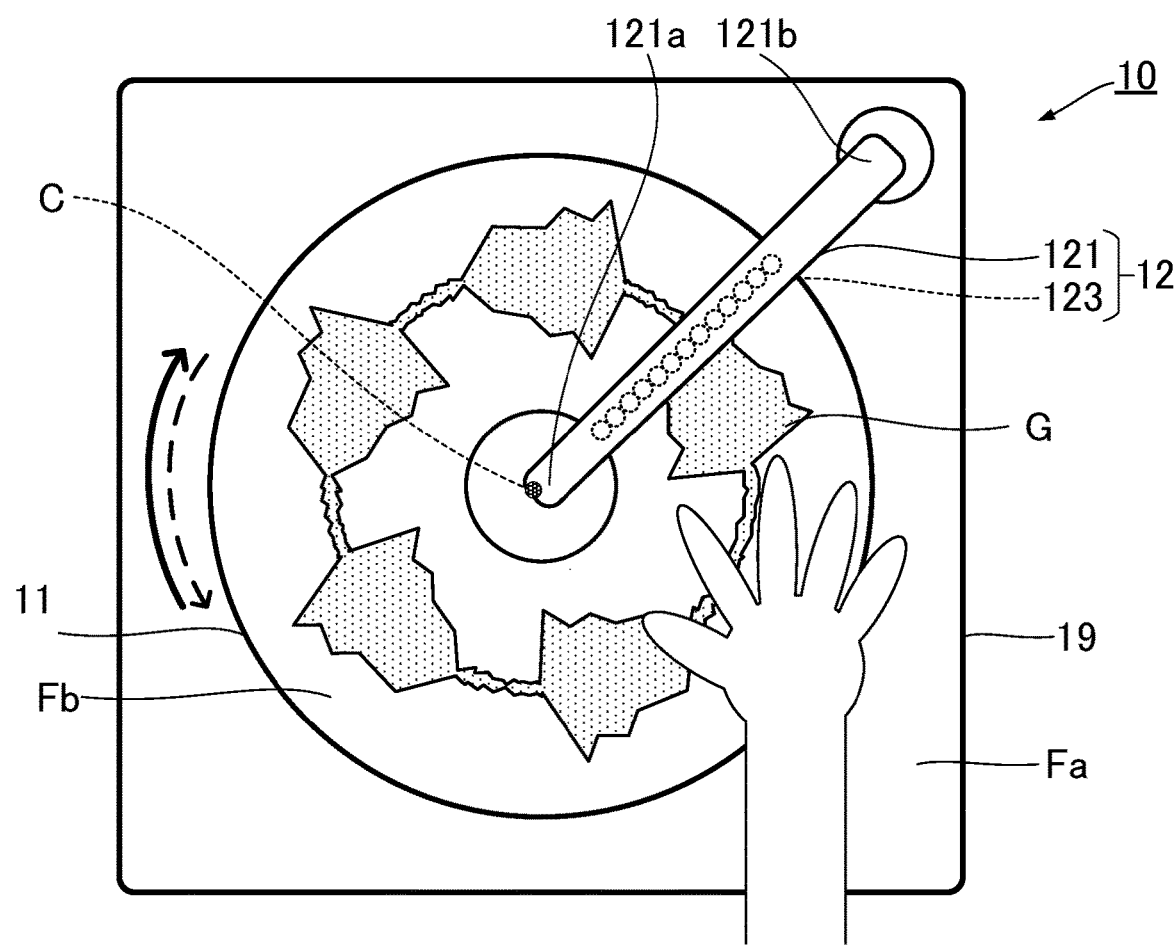
FIG. 3 is a plan view of the AV device.

FIG. 2 is a block diagram illustrating a functional configuration of the AV device 10. FIG. 3 is a plan view of the AV device 10. As illustrated in FIG. 2, the AV device 10 includes a rotary operator 11, a light source 12, a drive circuit 13, a detection circuit 14, a control circuit 15, a communicator 16, and a console 17. The AV device 10 has a housing 19, and these components of the AV device 10 are disposed on the housing 19. The housing 19 is hollow in structure, rectangular-parallelepiped in shape, and includes a mounting surface Fa. The mounting surface Fa is flat. When the AV device 10 is placed on a floor, the mounting surface Fa is positioned on the upper side of the housing 19 in a vertical direction. The rotary operator 11 and the light source 12 are disposed on the mounting surface Fa. The detection circuit 14, the drive circuit 13, the control circuit 15, and the communicator 16 are each housed within the housing 19.

The communicator 16 communicates with the terminal device 20, and receives, for example, the image data D transmitted from the terminal device 20. The console 17 is operated by the user to issue a variety of instructions to the terminal device 20. The console 17 includes, for example, operators (e.g., operating buttons) that are operated by the user. Specifically, the console 17 receives from the user an instruction to start rotation of the rotary operator 11 and an instruction to stop rotation of the rotary operator 11.

The rotary operator 11 (an example of a rotatable body) is manipulated by the user to change the playback point of the music. The user manipulates the rotary operator 11 to rotate in a desired direction (clockwise or counterclockwise). As illustrated in FIG. 3, the rotary operator 11 is a disc-shaped structure, and rotates around the center shaft C. The rotary operator 11 includes a manipulation surface Fb. The manipulation surface Fb is substantially parallel to the mounting surface Fa of the housing 19. The hand of the user is in contact with the manipulation surface Fb.

When the hand of the user touches the manipulation surface Fb, the user rotates the rotary operator 11 (i.e., performs a scratch operation) in a desired direction and at a desired speed, and the playback point is thereby caused to move on the time axis of the music. Specifically, the user rotates the rotary operator 11 around the center shaft C in a desired direction of rotation (either clockwise or counterclockwise) and at a desired angular velocity. The direction of rotation of the rotary operator 11 corresponds to a direction of movement (either forward or backward) of the playback point on the time axis of the music. The operation made by the user to rotate the rotary operator 11 clockwise equates to movement of the playback point backward (in a forward direction) on the time axis. The operation made by the user to rotate the rotary operator 11 counterclockwise equates to movement the playback point forward (backward direction) on the time axis.

The rotary operator 11 according to the first embodiment rotates in conjunction with playback of the music by the playback system 1. In other words, the rotary operator 11 rotates around the center shaft C as the playback point of the music (the sound signal Q) progresses. Accordingly, a time period of the operation for moving the playback point overlaps a time period during which the rotary operator 11 rotates. Specifically, the rotary operator 11 continuously rotates in one direction (e.g., clockwise direction) at an angular velocity that corresponds to the playback speed of the music. In this way, the user manipulates the rotary operator 11 in the rotating state.

The drive circuit 13 rotates the rotary operator 11 around the center shaft C at a predetermined angular velocity. An actuator, such as a motor, is used for the drive circuit 13. In the first embodiment, the drive circuit 13 starts or stops rotation of the rotary operator 11 in response to operation performed on the console 17 by the user.

The detection circuit 14 shown in FIG. 2 detects a direction of rotation and an angular velocity of the rotary operator 11, and generates a detection signal M. The detection signal M represents the direction of rotation and the angular velocity of the rotary operator 11. For example, a sensor, such as a rotary encoder that optically detects rotation of the rotary operator 11, is used for the detection circuit 14. When the rotary operator 11 is not manipulated by the user, the detection circuit 14 generates a detection signal M representative of a rotation of the rotary operator 11 in the clockwise at the 1o predetermined angular velocity. Conversely, when the rotary operator 11 is manipulated by the user, the detection circuit 14 generates a detection signal M representative of content (rotational direction and angular velocity of the rotary operator 11) of the manipulation. The communicator 16 transmits the detection signal M generated by the detection circuit 14 to the terminal device 20.

The communicator 25 of the terminal device 20 shown in FIG. 1 receives the detection signal M transmitted from the AV device 10. The signal processor 212 moves the playback point for each unit period, based on the detection signal M received by the communicator 25. The unit time has a time length sufficiently shorter than one cycle of the scratch operation.

Specifically, the signal processor 212 moves the playback point in the rotational direction (forward or backward) indicated by the detection signal M at a speed that corresponds to the angular velocity indicated by the detection signal M. The playback speed increases as the angular velocity of the rotary operator 11 increases. When manipulation of the rotary operator 11 is not present, the playback point changes in the forward direction at a constant speed. In contrast, when the rotary operator 11 is manipulated by the user, a position of the playback point changes based on the content (a direction of rotational and angular velocity of rotary operator 11) of the manipulation. The signal processor 212 supplies a portion corresponding to the moved playback point out of samples constituting the sound signal Q (sample that corresponds to the moved playback point), to the sound output device 30. In actuality, the signal processor 212 performs various kinds of acoustic processing (amplification, equalization, and so forth) on the sound signal Q, and supplies data that has undergone such processing to the sound output device 30.

The rotary operator 11 illustrated in FIG. 3 also plays a role in displaying the music image G. Specifically, the music image G is displayed on the manipulation surface Fb of the rotary operator 11. In other words, the music image is displayed as if integrated with the rotary operator 11. Thus, as viewed by the user, the music image G rotates around the center shaft C in conjunction with the rotation of the rotary operator 11. Specifically, the manipulation surface Fb is irradiated with light from the light source 12 and the music image G is displayed. The physical display mechanism is as follows. In the first embodiment, the manipulation surface Fb of the rotary operator 11 contains a phosphorescent material that accumulates light energy.

The phosphorescent material emits light by releasing light energy accumulated by exposure to an external light source. This light emission continues until a remaining amount of phosphorescence of the phosphorescent material decreases to close to zero. For example, a phosphorescent sheet formed of the phosphorescent material is applied to the rotary operator 11. The rotary operator 11 is obtained by bonding the phosphorescent sheet to the surface of the round substrate of the rotary operator 11. Within the entire manipulation surface Fb of the rotary operator 11, a portion that has received light from the light source 12 emits light. The light emitting portion displays an image (the music image G). The music image G according to the first embodiment is an image that corresponds to a playback point of the music. FIG. 3 shows a music image G at a given playback point. For simplicity of explanation, a case in which the rotary operator 11 rotates clockwise is explained below. Normally, the playback point shifts forward of the music with a lapse in time. As a consequence, the music image G changes based on a position of the playback point in the music. The music image G includes a portion that corresponds to the playback point in the waveform of the sound signal Q and is displayed on the manipulation surface Fb. It is of note that the music image G may change depending on a volume of the music. Likewise, the waveform of the sound signal Q to be played back changes depending on the volume, and the music image G displayed on the manipulation surface Fb changes.

The light source 12 irradiates the manipulation surface Fb with light under control of the control circuit 15. The light source 12 according to the first embodiment includes a supporter 121 and N light emitters 123 (N is a natural number of 2 or more). Each of the N light emitters 123 is, for example, a light emitting diode (LED). The supporter 121 is an arm-shaped structure, and extends along the radial direction of the rotary operator 11. The supporter 121 supports the N light emitters 123 above the manipulation surface Fb. The supporter 121 includes a first end 121a that comes into contact with a center of the rotary operator 11 and a second end 121b fixed to the mounting surface Fa. The underside of the supporter 121 faces the manipulation surface Fb with a space being left between the underside of the supporter 121 and the manipulation surface Fb.

The N light emitters 123 are disposed on the underside of the supporter 121 such that an optical axis of each of the N light emitters 123 is perpendicular to the manipulation surface Fb. The N light emitters 123 are arranged along a direction of extension the supporter 121. In other words, the light emitters 123 are linearly arranged along the radial direction of the rotary operator 11. Thus, in planar view in a direction orthogonal to the rotary operator 11, a distance between the center (the center shaft C) of the rotary operator 11 and one light emitter from among the N light emitters 123 differs from a distance between the center of the rotary operator 11 and another light emitter. Accordingly, within the entire manipulation surface Fb, a linear region along the radial direction of the manipulation surface Fb is irradiated with light from the light source 12.

The first end 121a of the supporter 121 rotates in a horizontal plane about the fixed second end 121b above the mounting surface Fa. Accordingly, when display of the music image G is not required, the user may move the first end 121a of the supporter 121 to the outside of the manipulation surface Fb so that the first end 121a does not come into contact with the rotary operator 11. In place of the light source 12, a light source that is detachable from the housing 19 may be adopted instead.

Figure 4:
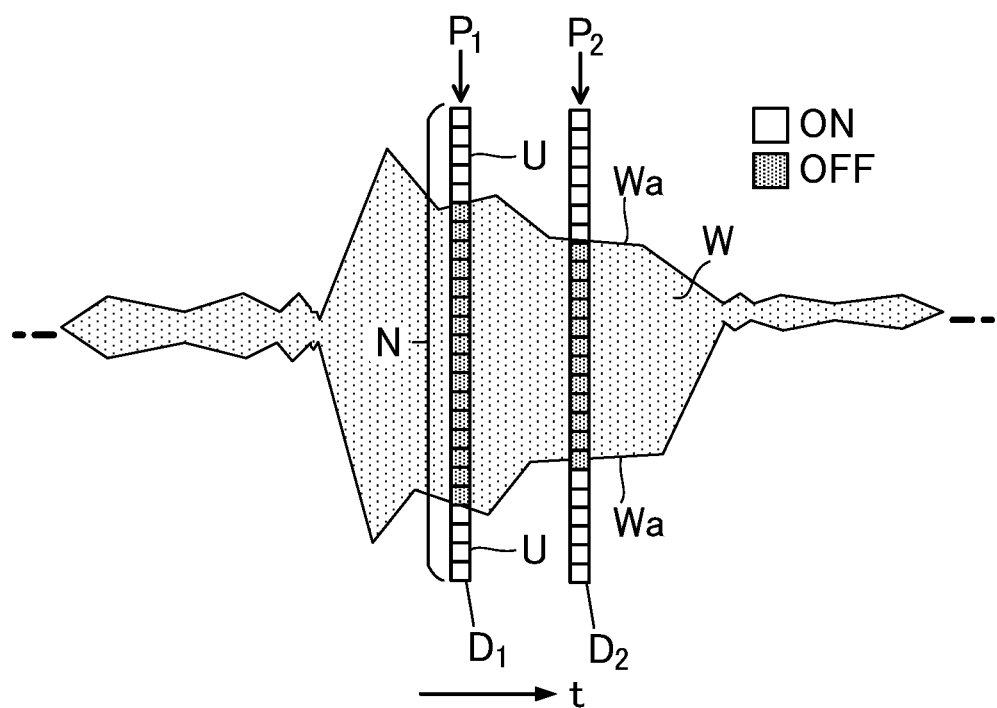
FIG. 4 is a schematic view illustrating temporal change of a waveform of the sound signal and image data at a playback point.

In the terminal device 20 illustrated in FIG. 1, the image processor 214 generates the image data D that corresponds to the playback point. FIG. 4 is a schematic view illustrating temporal change in a waveform W of the sound signal Q and image data D at a playback point P. Specifically, the image processor 214 generates image data D for each unit period (playback point P). When a position of the playback point P on the time axis changes, the image data D also changes. For ease of explanation, in FIG. 4 there are shown image data $D_1$ at a playback point $P_1$, and image data $D_2$ at a playback point $P_2$ after the playback point $P_1$. The image data D includes N unit data U that correspond to the light emitters 123, respectively. The image data D at the playback point P consists of N-bit data. An array of the N unit data U corresponds to an array of the N light emitters 123 provided on the supporter 121. Unit data U that corresponds to a light emitter 123 indicates "ON (light emission)" or "OFF (light extinction)" of the light emitter 123 at the playback point P. The image processor 214 sets numerical values for the N unit data U constituting the image data D at the playback point P, as follows. The image processor 214, at the playback point P, sets a numerical value (e.g., "1") indicating "ON" for unit data U positioned in a region surrounded by envelopes Wa of the sound signal Q. Conversely, the image processor 214 sets a numerical value (e.g., "0") indicating "OFF" for unit data U positioned outside the region. The image processor 214 supplies the generated image data D to the AV device 10.

The control circuit 15 controls the light source 12 based on the image data D transmitted from the terminal device 20. Specifically, the control circuit 15 controls ON/OFF for each of the light emitters 123 each time the circuit receives the image data D (i.e., for each unit period). The control circuit 15 turns on or off respective light emitters 123 in correspondence with N unit data U constituting the image data D. As viewed by the user, within the entire manipulation surface Fb, a region irradiated with light from the light source 12 (i.e., the light emitting region) rotates in a circumferential direction of the manipulation surface Fb in conjunction with rotation of the rotary operator 11. Accordingly, when the control circuit 15 controls the light emitters 123 based on the image data D to be continuous on the time axis, the music image G representative of the music waveform is displayed on the manipulation surface Fb along the circumferential direction of the manipulation surface Fb.

Commencing from a point in time at which the phosphorescent sheet is irradiated with light from the light source 12, an amount of phosphorescence (i.e., light emission amount) of the phosphorescent sheet decreases over time. Accordingly, from the point in time at which the irradiation takes place, a density (amount of light emission) of the music image G displayed on the manipulation surface Fb also decreases with time. For example, when the light source 12 irradiates a specific region of the manipulation surface Fb with light, the amount of phosphorescence of the region decreases to approach zero until the region rotates once and returns to its original position. Thereafter, when the region where the phosphorescent amount approaches zero reaches just below the light source 12. As described, the position of the playback point P in the music changes to a forward position with time. The light source 12 irradiates the region with light again based on new image data D that corresponds to the playback point P. It is of note that the light source 12 irradiates the manipulation surface Fb with light at an intensity that causes the amount of phosphorescence to approach zero while the rotary operator 1 completes one rotation. In other words, the music image G is overwritten with a new music image G by the light source 12 each time the manipulation surface Fb completes one rotation. Accordingly, the user is able to visually recognize the music image G irradiated with light by the light source 12 without distraction of the music image G irradiated one round before. As described, the music image G displayed on the manipulation surface Fb changes in conjunction with progress of the music (i.e., movement of the playback point P). When the playback point P is moved in response to manipulation of the rotary operator 11, the music image G also changes in response to manipulation of the rotary operator 11. In other words, in conjunction with irradiation from the light source 12, the music image G is displayed on the manipulation surface Fb in conjunction with the circumferential direction of the manipulation surface Fb by the rotation of the rotary operator 11.

Figure 5:
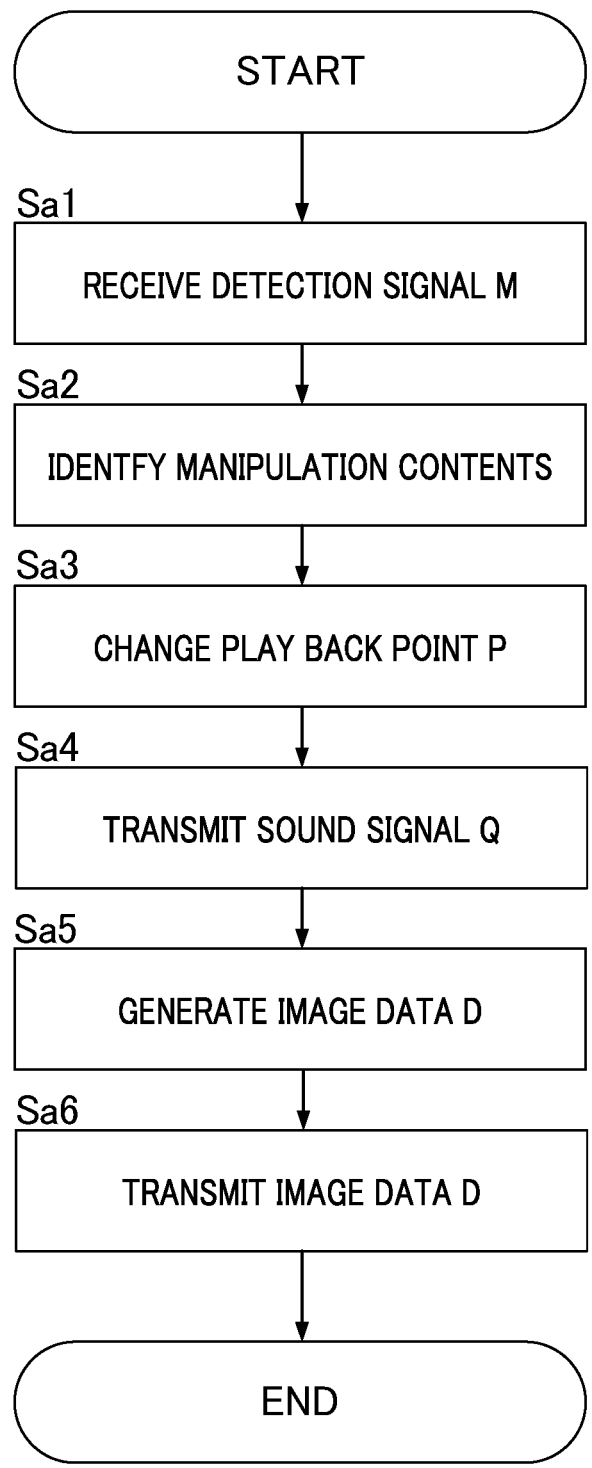
FIG. 5 is a flowchart showing processing by a controller of a terminal device.

FIG. 5 is a flowchart of controller 21 processing of the terminal device 20. Upon receipt from the user of a playback instruction, the processing illustrated in FIG. 5 starts. The processing illustrated in FIG. 5 is repeatedly performed for each unit period. The detection circuit 14 of the detection circuit 14 detects a rotational direction and an angular velocity of the rotary operator 11, and generates a detection signal M. The communicator 16 transmits the detection signal M to the terminal device 20. Then, the communicator 25 of the terminal device 20 receives the detection signal M transmitted from the AV device 10 under the control of the controller 21 (Sa1). The signal processor 212 identifies the manipulation content (rotational direction and angular velocity) of the rotary operator 11 from the detection signal M transmitted from the AV device 10 (Sa2). The signal processor 212 changes a position of a playback point P of the music based on the manipulation contents of the rotary operator 11 (Sa3). Specifically, the signal processor 212 changes the position of the playback point P in the rotational direction (forward or backward) of the rotary operator 11 at a speed that corresponds to an angular velocity of the rotary operator 11. The controller 21 transmits a portion that corresponds to the moved playback point P (a sample that corresponds to the changed playback point from among the samples constituting a sound signal Q) to the sound output device 30 (Sa4). The image processor 214 generates image data D that corresponds to the playback point P of the music (Sa5). Specifically, the image processor 214 determines whether each of the N pieces of unit data U constituting the image data D at the playback point P is positioned inside the region surrounded by envelopes Wa of the sound signal Q at the playback point P to generate the image data D. The communicator 25 transmits the image data D to the AV device 10 under the control of the controller 21 (Sa6). The light source 12 of the AV device 10 irradiates the manipulation surface Fb with light based on the image data D transmitted from the terminal device 20. The music image G that corresponds to the playback point P of the music is displayed on the manipulation surface Fb irradiated with light by the light source 12.

As described, in the first embodiment, the music image G is displayed on the rotary operator 11. When the user rotates the rotary operator 11 to change the playback point P of the music, the music image G rotates around the center shaft C in conjunction with the rotation of the rotary operator 11. Thus, for example, as compared with an AV device that is configured to display a music image G on a display device that is separate from the rotary operator 11 (hereafter, referred to as a "comparative example"), a visual rendering effect is enhanced. In the comparative example the visual rendering effect could be realized if the user were able to view rotation of the music image G in conjunction with the rotation of the rotary operator 11. However, to realize such a visual rendering effect, a complicated display control mechanism that is able to rotate the music image G in conjunction with the rotation of the rotary operator would be required. In the present disclosure, the rotary operator 11 displays the image. Therefore, even when the image is not rotated by the display control, as viewed by the user, the music image G rotates in conjunction with the rotation of the rotary operator 11. As a result, a processing load required to effect display control of the music image G is reduced as compared to that required in the comparative example.

According to the first embodiment in which the music image G is displayed on the manipulation surface Fb of the rotary operator 11, an area usable for the display of the music image G can be easily secured to advantage. In the first embodiment, the manipulation surface Fb of the rotary operator 11 is irradiated with light from the light source 12 whereby the music image G is displayed. Accordingly, the music image G is displayed on the rotary operator 11 by way of a simple configuration. In the first embodiment, since the manipulation surface Fb contains the phosphorescent material, a density of the music image G reduces with time. Consequently, there is no need to use processing to erase the music image G. Furthermore, there is no need to supply power to the rotary operator 11 to display the music image G. As compared with an AV device with a display panel configured to use a power supply, the configuration of the AV device 10 is relatively simple. As compared with an AV device configured to have a flat display panel used as a display to display a music image and as a rotary operator, a relatively low mechanical strength of the display suffices.

In the first embodiment, the light emitters 123 are arranged along the radial direction of the rotary operator 11, and the manipulation surface Fb is irradiated with light by the light emitters 123. Accordingly, for example, as compared with an AV device that is configured to have the light emitters 123 arranged over a wide range of the manipulation surface Fb, it is possible to display the music image G over the entire manipulation surface Fb of the rotary operator 11 without inhibiting manipulation by the user. Furthermore, the music image G continuously rotates in the circumferential direction of the manipulation surface Fb in conjunction with playback of the music. Accordingly, as compared with an AV device in which the rotary operator 11 is configured to rotate only during a period during when the rotary operator 11 is manipulated by the user, an attained visual rendering effect is advantageously high.

In the first embodiment, since the displayed music image G changes in accordance with a change in the playback point P of the music, the user is able to visually perceive with ease the playback point P of the music. As a result, the user is able to perform with ease DJ play. Furthermore, the waveform of the portion that corresponds to the playback point P, of the sound signal Q of the music is displayed. By enabling the user to visually perceive with ease the playback point P of the music a significant advantage is provided. In particular, since the rotary operator 11 displays the music image including the portion that corresponds to the playback point P in the waveform of the sound signal Q representative of the music, the ease with which the user is able to visually perceive the playback point P of the music provides a significant advantage.

Second Embodiment

A second embodiment of the present disclosure will be described. In the embodiment now described, elements having the same functions and processing as in the first embodiment are respectively denoted by the same reference numerals as used for like elements in the description of the first embodiment, and detailed description thereof is omitted, as appropriate.

Figure 6:
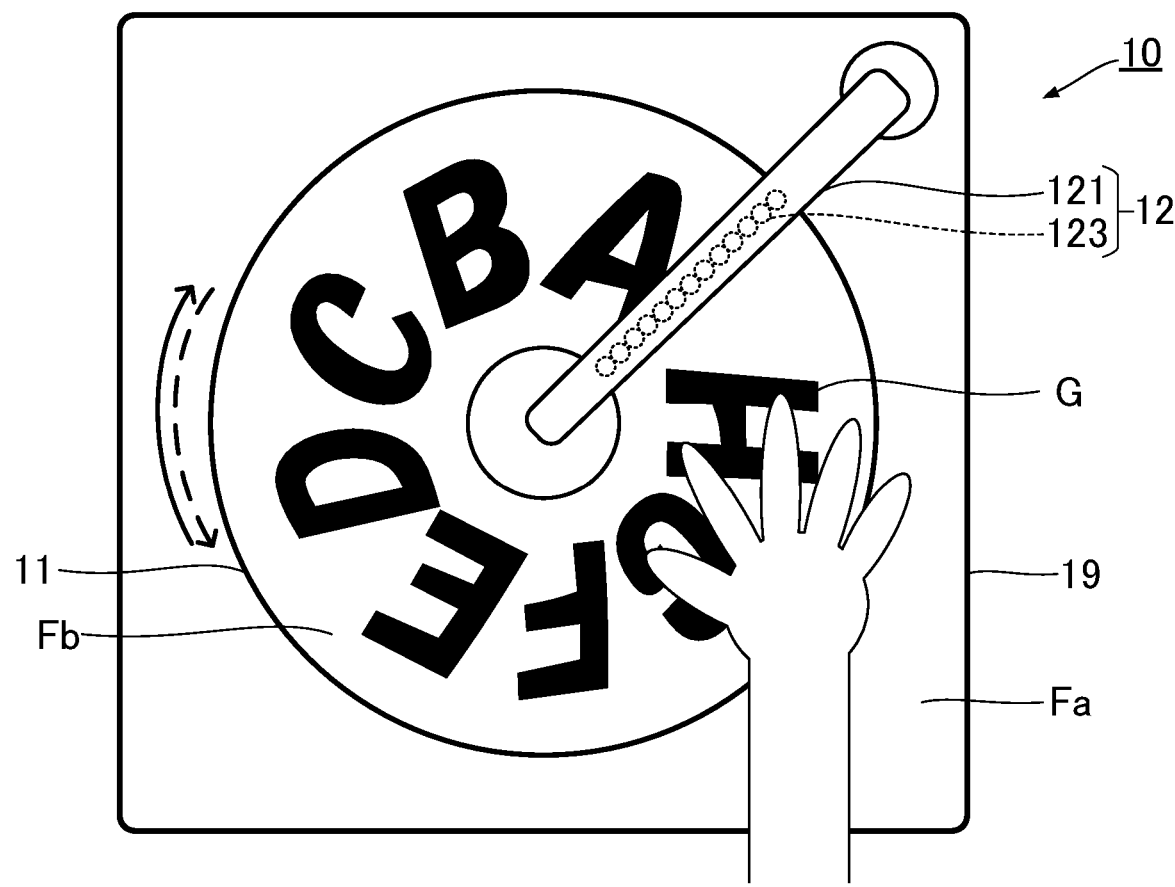
FIG. 6 is a plan view of an AV device according to a second embodiment.

FIG. 6 is a plan view of the AV device 10 according to the second embodiment. The AV device 10 according to the first embodiment displays a the music image G representative of a waveform of a sound signal Q of music, whereas the AV device 10 according to the second embodiment displays the music image G representative of lyrics of the music. The configuration of the AV device 10 is similar to the configuration according to the first embodiment. The storage device 23 of the terminal device 20 according to the second embodiment has stored thereon a lyric image in addition to the sound signal Q. The lyric image is a bitmap image representative of lyrics (character strings) of the music.

Figure 7:
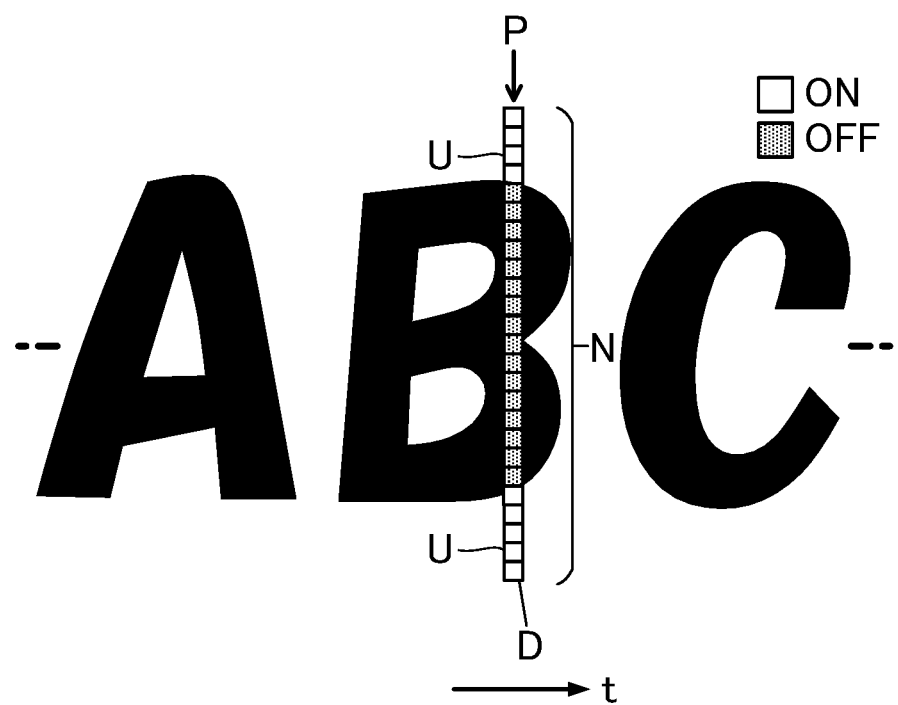
FIG. 7 is a schematic view illustrating image data at a playback point in the second embodiment.

The signal processor 212 of the terminal device 20 changes a position of the playback point P of the music based on the detection signal M transmitted from the AV device 10, as with the first embodiment. The image processor 214 generates image data D that corresponds to the playback point P, a position of which is changed by the signal processor 212. Image data D includes N unit data U that respectively corresponds to the light emitters 123, as in the first embodiment. FIG. 7 is a schematic view illustrating the image data D at a playback point in the second embodiment. In the second embodiment, the image processor 214 sets numerical values for each of unit data U that constitutes the lyric image at the playback point P, as follows. For each character of the lyrics, the image processor 214 sets a numerical value indicating "ON" for unit data U within a character. Conversely, the image processor 214 sets a numerical value indicating "OFF" for unit data U outside a character. The image processor 214 transmits the generated image data D to the AV device 10.

The control circuit 15 of the AV device 10 controls the light source 12 based on the image data D, in a similar manner to the first embodiment. The light source 12 irradiates the manipulation surface Fb with light under the control of the control circuit 15. The manipulation surface Fb irradiated with light by the light source 12 displays the music image G that corresponds to the playback point P of the music, as in the first embodiment. In the second embodiment, the rotary operator 11 displays the music image G including a portion that corresponds to the playback point P out of the lyrics of the music. Accordingly, the lyrics of the music are displayed on the manipulation surface Fb in conjunction with playback of the music.

The second embodiment enables realization of a similar effect to that of the first embodiment. In particular, in the second embodiment the music image G including the portion that corresponds the playback point P from the lyrics of the music is displayed on the manipulation surface Fb. Enabling the user to visually perceive with ease the playback point P of the music provides a significant advantage.

MODIFICATIONS

Aspects described above may be modified in various ways. Aspects of specific modifications will be described. Two or more modes chosen freely from among the following may be combined so long as they do not conflict.

(1) In each of the above-described embodiments, the AV device 10 may include the signal processor 212 and the image processor 214 of the terminal device 20. In this case, the terminal device 20 is no longer required.

(2) In each of the above-described embodiments, the light emitters 123 of the light source 12 are linearly arranged along the radial direction of the rotary operator 11; however, the array of the light emitters 123 is not limited thereto.

(A) For example, the light emitters 123 may be arranged in a plurality of lines along the circumferential direction of the manipulation surface Fb. That is, the light emitters 123 may be arranged in the circumferential direction as well as the radial direction of the manipulation surface Fb. Alternatively, the light emitters 123 may be arranged in a zigzag pattern.

(B) A music image G may be displayed on the rear surface of the manipulation surface Fb of the rotary operator 11. In this case, a translucent substrate may be applied to the rotary operator 11, and a phosphorescent sheet may be bonded to the rear surface of the substrate (the rear surface of the manipulation surface Fb). The light source 12 irradiates with light the front surface of the manipulation surface Fb, such that the light is incident to the rear surface of the manipulation surface Fb from the front surface thereof, and thereby the music image G is displayed on the rear surface of the manipulation surface Fb.

(3) In each of the above-described embodiments, the manipulation surface Fb contains the light accumulating material, and the light source 12 irradiates the manipulation surface Fb with light to display the music image G on the manipulation surface Fb. However, the configuration to display the music image G on the manipulation surface Fb is not limited to thereto.

(A) A smartphone may be used in place of the light emitters 123. In this case, the smartphone irradiates the manipulation surface Fb of the rotary operator 11 with light. Specifically, the smartphone may be disposed above the manipulation surface Fb such that the screen of the smartphone faces the manipulation surface Fb. To stably mount the smartphone, there may be employed equipment like the supporter 121, or a tripod for a camera. Alternatively, the user himself/herself may hold the smartphone. As shown in FIG. 4, the smartphone may display in one dimension an arrangement of N squares. Then the smartphone may brightly display, based on the sound signal Q, a square(s) that corresponds to "ON (light emission)", and display in black the remaining squares. Alternatively, the smartphone may display in one dimension an arrangement of the squares such that a specific square(s) flashes.

(B) For example, a display panel may be mounted to the substrate of the rotary operator 11. Examples of the display panel includes a liquid crystal display, an organic EL display, and an electrophoretic display (e.g., electronic paper).

There may be mounted, on the substrate of the rotary operator 11, a display panel that displays an image by moving microparticles of a magnetic material by magnetic force. As described, the light source 12 is no longer required. Furthermore, there may be provided, on the substrate of the rotary operator 11, a transparent plate having a pattern processed based on the music image G. In this case, the music image G is displayed when the light emitters 123 irradiate the transparent plate with light.

(4) In each of the above-described embodiments, the rotary operator 11 rotates in conjunction with playback of the music; however, rotation of the rotary operator 11 in conjunction with playback of the music is not essential. In other words, only during a period in which the rotary operator 11 is manipulated by the user, does the rotary operator 11 rotate in response to the manipulation.

(5) In each of the above-described embodiments, the music image G is displayed on the entire circumference of the manipulation surface Fb. However, the music image G may be displayed on only a portion of the manipulation surface Fb.

(6) In each of the above described embodiments, for example, when the terminal device 20 receives an operation to change a playback condition (e.g., volume, pitch, or speed) of the music from the user, a display mode (e.g., color or size) of the music image G may change based on the change in the condition. Furthermore, an image representative of the content of the operation carried out by the user to the terminal device 20 may be displayed on the manipulation surface Fb.

(7) In each of the above-described embodiments, the music image G is displayed on the manipulation surface Fb of the rotary operator 11. However, the music image G may be displayed on a surface other than the manipulation surface Fb of the rotary operator 11. For example, the music image G may be displayed on a side surface of the rotary operator 11.

(8) In each of the above-described embodiments, the rotary operator 11 displays the music image G; however, the image displayed by the rotary operator 11 is not limited to the music image G. The rotary operator 11 may display an image unrelated to the music played back by the sound output device 30 (e.g., an image related to an advertisement). In the above-described configuration, in the storage device 23 there is stored in advance the bitmap data representative of the image; and the image processor 214 generates the image data D by way of the bitmap data. The embodiments do not require change of the image on the manipulation surface Fb in conjunction with change in the playback point P of the music. In other words, the rotary operator 11 may display on the manipulation surface Fb an image that is fixed to a playback period of the music. That is, the music image G need not necessarily change. The image displayed by the rotary operator 11 is freely selectable, and is changeable by the control circuit 15. The image is not limited to an image representative of information recognizable by the user (e.g., music image G). For example, each of the N light emitters 123 may randomly blink to display an image on the manipulation surface Fb.

(9) In each of the above-described embodiments, the rotary operator 11 displays, as the music image G, the data of a portion that corresponds to the playback point P, in the waveform or the lyrics of the sound signal Q. The music image G that corresponds to the playback point P is not limited to the described embodiments. For example, the rotary operator 11 may display the music image G inclusive of a portion that corresponds to the playback point P, in a musical score of the music. For example, the rotary operator 11 may display the music image G inclusive of a portion that corresponds to the playback point P, in a musical score of the music.

(10) In each of the above-described embodiments, the AV device 10 may vibrate the rotary operator 11 based on the portion that corresponds to the playback point P, in the sound signal Q. In this configuration, the AV device 10 includes a vibrator that vibrates the rotary operator 11. For example, the terminal device 20 transmits the sound signal Q to the AV device 10, and the vibrator vibrates the rotary operator 11 based on the sound signal Q.

(11) In each of the above-described embodiments, the sound output device 30 is separated both from the AV device 10 and the terminal device 20. However, the sound output device 30 may be integrated with the AV device 10 or the terminal device 20.

(12) In each of the above-described embodiments, the DJ controller is described as an example of the AV device 10. However, the AV device 10 is not limited to the DJ controller. For example, a record player may be used as the AV device 10. In the above-described configuration, for example, the light source 12 is disposed on a tone arm, and the music image G is displayed on a surface of a record (a surface on which a needle of the tone arm is placed). For example, a phosphorescent sheet is bonded to the surface of the record. As described, providing that the rotatable body displays the music image G in conjunction with change in a position of the playback point of the music, the rotatable body may be the rotary operator 11 or a record disk. The rotary operator 11 is an example of "a rotatable body manipulated by the user". The record disk is an example of "a rotatable body that is not manipulated by the user."

(13) In each of the above-described embodiments, the music image G may include a portion (hereinafter, "forward portion") that corresponds to a time point prior to (backward on a time axis) the playback point P. Here, the term "a time point prior to the playback point" means a time point before a given time. The term "given time" is, for example, a time ranging from 0.5 to 2 seconds, inclusive. In the first embodiment, a portion that corresponds to the time point prior to the playback point P of the sound signal Q is illustrated as the backward portion. In the second embodiment, a portion that corresponds to the time point prior the playback point P of the lyric image is illustrated as the forward portion. Specifically, the image processor 214 generates the image data D that corresponds to the backward portion of the waveform W of the sound signal Q, and supplies the generated image data D to the AV device 10. In the above-described configuration, the music image G including the backward portion is displayed prior to the playback point P of the music. Therefore, for example, the user perform with ease the DJ play.

(14) To display various kinds of images, for example, a wheel of a bicycle or a car may be used as the rotatable body (the rotary operator 11). Alternatively, a turntable on which a product, a work, or other similar things is placed for display may be used as the rotatable body (the rotary operator 11). As described, the rotatable body according to the present disclosure may be employed for rotatable bodies that are not premised on the playback point P of the music to display an image. The rotatable body according to the present disclosure may be used in a DJ controller toy for children.

(15) The functions of the terminal device 20 illustrated above are realized by cooperation of the one or the plurality of processors constituting the controller 21 and the programs stored in the storage device 23 as already described. The programs according to the present disclosure may be provided in a form storable in a computer-readable recording medium, and installed in a computer. Examples of the recording medium include a non-transitory recording medium, and an optical recording medium (optical disc) such as a CD-ROM is suitable. The recording medium includes a recording medium in choice of a well-known format such as a semiconductor recording medium and a magnetic recording medium. The non-transitory recording medium includes an optional recording medium excluding a transitory propagating signal, and does not exclude a volatile recording medium. Further, in a terminal device having a configuration in which a distribution device distributes programs through a communication network, the storage device 23 that stores thereon the programs in the distribution device corresponds to the above-described non-transitory recording medium.

(16) For example, the following aspect is understood from the foregoing embodiments.

Aspect 1

An AV device according to one aspect (aspect 1) of the present disclosure includes: a drive circuit; and a rotatable body configured to be driven by the drive circuit and configured to change a playback point of a sound signal representative of a series of sounds in accordance with a rotation of the rotatable body, in which the rotatable body configured to change the playback point of the sound signal is further configured to display an image.

According to the above-described configuration, the playback point of the sound signal changes in accordance with the rotation of the rotatable body, and the rotatable body displays an image. Accordingly, a visual rendering effect is high as compared with, for example, an AV device having a configuration in which an image is displayed on a display device provided separate from the rotatable body.

Aspect 2

In the AV device according to one example (aspect 2) of aspect 1, the rotatable body is a rotary operator rotatable by a user to change the playback point.

According to the above-described configuration, since the rotary operator displays an image, the image is also rotated in accordance with manipulation of the rotary operator, as viewed from the user. Therefore, the visual rendering effect is remarkably high.

Aspect 3

In the AV device according to one example (aspect 3) of aspect 2, the rotary operator includes a manipulation surface, and the image is displayed on the manipulation surface.

According to the above-described configuration, since the image is displayed on the manipulation surface, an area usable for display of the image can be easily secured.

Aspect 4

The AV device according to one example (aspect 4) of aspect 3 further includes: a light source configured to irradiate the manipulation surface of the rotary operator with light, in which the manipulation surface contains a phosphorescent material, and in which irradiation from the light source causes the rotary operator to display the image on the manipulation surface.

Aspects 5 and 6

In the AV device according to one example (aspect 5) of aspect 4, the light source includes light emitters. In the AV device according to one example (aspect 6) of aspect 5, the light emitters are arranged along a radial direction of the rotary operator.

In the above-described configuration, the light emitters are arranged along the radial direction, and irradiate the rotary operator with light. Accordingly, for example, as compared with an AV device having a configuration in which light emitters are arranged over a wide range of the manipulation surface, it is possible to display the image over the entire manipulation surface of the rotary operator without inhibiting manipulation by the user.

Aspect 7

In the AV device according to any one (aspect 7) of aspects 2 to 6, the rotary operator is configured to be rotated by the drive circuit in conjunction with playback of the sound signal.

In the above-described configuration, the image continuously rotates in conjunction with playback of the sound signal. Accordingly, as compared with an AV device having a configuration in which the rotary operator rotates only during a period in which the user operates the rotary operator, a visual rendering effect is high.

Aspect 8

In the AV device according to any one (aspect 8) of aspects 1 to 7, the image is an image that corresponds to the playback point.

In the thus-described configuration, the displayed image changes in conjunction with a change in the playback point of the sound signal. Therefore, the user is able to visually perceive with ease the playback point of the music. In other words, the user can perform with ease DJ play.

Aspect 9

In the AV device according to one example (aspect 9) of aspect 8, the image includes a portion that corresponds to the playback point in a waveform of the sound signal.

In the thus-described configuration, the image includes a portion that corresponds to the playback point in a waveform of the sound signal representative of the music, and the image is displayed. Accordingly, an effect of enabling the user to visually perceive with ease the playback point of the music provides a significant advantage.

Aspect 10

In the AV device according to one example (aspect 10) of aspect 8, the sound signal is a signal representative of a piece of music, and the image includes a portion that corresponds to the playback point in lyrics of the piece of music.

In the above-described configuration, the image includes a portion that corresponds to the playback point in lyrics of the music, and the image is displayed. Accordingly, the effect of enabling the user to visually perceive with ease the playback point of the music provides a significant advantage.

Aspect 11

In the AV device according to one example (aspect 11) of aspect 9 or 10, the image includes a portion that corresponds to a playback point prior to the playback point.

In the above-described configuration, the image includes a portion that corresponds to a playback point prior to the playback point, and the image is displayed prior to the playback point of the music. Accordingly, for example, the DJ play can be performed with ease.

Aspects 12 and 13

A playback method according to one aspect (aspect 12) of the present disclosure includes: changing a playback point of a sound signal representative of a series of sounds in accordance with a rotation of a rotatable body; and displaying an image on the rotatable body that is rotatable to change the playback point of the sound signal. In the playback method according to one example (aspect 13) of aspect 12, the image displayed on the rotatable body corresponds to the playback point of the sound signal.

Aspects 14 and 15

A playback system according to one aspect (aspect 14) of the present disclosure includes: a playback device configured to play back a sound signal representative of a series of sounds; and an audio visual (AV) device configured to be connected to the playback device, in which the AV device includes a rotatable body configured to change a playback point of the sound signal in accordance with a rotation of the rotatable body, and in which the rotatable body configured to change the playback point of the sound signal is further configured to display an image. In the playback system according to one example (aspect 15) of aspect 14, the image displayed on the rotatable body corresponds to the playback point of the sound signal.

DESCRIPTION OF REFERENCE SIGNS

1 . . . playback system, 11 . . . rotary operator, 12 . . . light source, 121 . . . supporter, 123 . . . light emitter, 13 . . . drive circuit, 14 . . . detection circuit, 15 . . . control circuit, 16 . . . communicator, 17. console, 19 . . . housing, 20 . . . terminal device, 21 . . . controller, 212 . . . signal processor, 214 . . . image processor, 23 . . . storage device, 25 . . . communicator. 27 . . . operation part, 30 . . . sound output device

What is claimed is:

1. An audio visual (AV) device comprising:
a control circuit configured to obtain image data corresponding to a sound signal representative of a series of sounds and to cause an image to be displayed based on the obtained image data corresponding to the sound signal;
a drive circuit;
a rotatable body configured to be driven by the drive circuit and configured to change a playback point of the sound signal representative of the series of sounds in accordance with a rotation of the rotatable body; and
a light source,
wherein the rotatable body configured to change the playback point of the sound signal is further configured to display the image based on obtained image data corresponding to the playback point of the sound signal representative of the series of sounds,
wherein the rotatable body is a rotary operator rotatable by a user to change the playback point,
wherein the rotary operator includes a manipulation surface, and the image is displayed on the manipulation surface,
wherein the light source is configured to irradiate the manipulation surface of the rotary operator with light,
wherein the manipulation surface contains a phosphorescent material, and
wherein irradiation from the light source causes the rotary operator to display the image on the manipulation surface.

2. The AV device according to claim 1, wherein the light source includes light emitters.

3. The AV device according to claim 2, wherein the light emitters are arranged along a radial direction of the rotary operator.

4. The AV device according to claim 1, wherein the rotary operator is configured to be rotated by the drive circuit in conjunction with playback of the sound signal.

5. The AV device according to claim 1, wherein the image includes a portion that corresponds to the playback point in a waveform of the sound signal.

6. The AV device according to claim 5, wherein the image includes a portion that corresponds to another playback point prior to the playback point.

7. The AV device according to claim 1, wherein:
the sound signal is a signal representative of a piece of music, and
the image includes a portion that corresponds to the playback point in lyrics of the piece of music.

8. The AV device according to claim 1, wherein the displayed image changes depending on a volume of the sound signal corresponding to the playback point of the sound signal.

9. A playback method comprising:
obtaining image data corresponding to a sound signal representative of a series of sounds;
changing a playback point of the sound signal representative of the series of sounds in accordance with a rotation of a rotary operator that is rotatable by a user to change the playback point, the rotary operator including a manipulation surface containing a phosphorescent material; and
irradiating, using a light source, the manipulation surface of the rotary operator with light to thereby display an image on the manipulation surface of the rotary operator based on obtained image data corresponding to the playback point of the sound signal representative of the series of sounds.

10. A playback system comprising:
a sound signal playback device configured to play back a sound signal representative of a series of sounds; and
an audio visual (AV) device configured to be connected to the sound signal playback device,
wherein the AV device includes:
a control circuit configured to obtain image data corresponding to the sound signal representative of the series of sounds and to cause an image to be displayed based on the obtained image data corresponding to the sound signal;
a drive circuit;
a rotatable body configured to be driven by the drive circuit and configured to change a playback point of the sound signal in accordance with a rotation of the rotatable body; and
a light source,
wherein the rotatable body configured to change the playback point of the sound signal is further configured to display the image based on obtained image data corresponding to the playback point of the sound signal representative of the series of sounds,
wherein the rotatable body is a rotary operator rotatable by a user to change the playback point,
wherein the rotary operator includes a manipulation surface, and the image is displayed on the manipulation surface,
wherein the light source is configured to irradiate the manipulation surface of the rotary operator with light,
wherein the manipulation surface contains a phosphorescent material, and wherein irradiation from the light source causes the rotary operator to display the image on the manipulation surface.

\* \* \* \* \*